Jan. 5, 1926.　　　　　　　　　　　　　　　　　　　1,568,585
L. J. BRUNE, SR

ELECTRIC WIRE CONNECTER

Filed Sept. 11, 1924

Inventor
L. J. Brune Sr.
By D. Swift
Attorney

Patented Jan. 5, 1926.

1,568,585

UNITED STATES PATENT OFFICE.

LOUIS J. BRUNE, SR., OF ALGIERS, LOUISIANA.

ELECTRIC WIRE CONNECTER.

Application filed September 11, 1924. Serial No. 737,119.

*To all whom it may concern:*

Be it known that I, LOUIS J. BRUNE, Sr., a citizen of the United States, residing at Algiers, in the parish of Orleans, State of Louisiana, have invented a new and useful Electric Wire Connecter; and I do hereby declare the following to be a full, clear, and exact description of the invention, such as will enable others skilled in the art to which it appertains to make and use the same.

The invention relates to electric wire connecters, and has for its object to provide a device of this character whereby adjacent ends of wires may be easily and quickly and also positively connected together without the necessity of soldering or splicing, which requires considerable skill. It has been found that many fires are caused incident to loose or poor connections which arc, and to obviate this difficulty the device is primarily designed.

A further object is to provide an electric connecter comprising a sleeve having an insulating covering, and which sleeve is provided with instruck oppositely disposed teeth adjacent its ends adapted to bite into electric wires forced into the ends of the sleeve and positively hold the wires against outward movement.

A further object is to concave the opposite ends of the insulating material surrounding the sleeve for overlying the insulating material carried by the wires.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
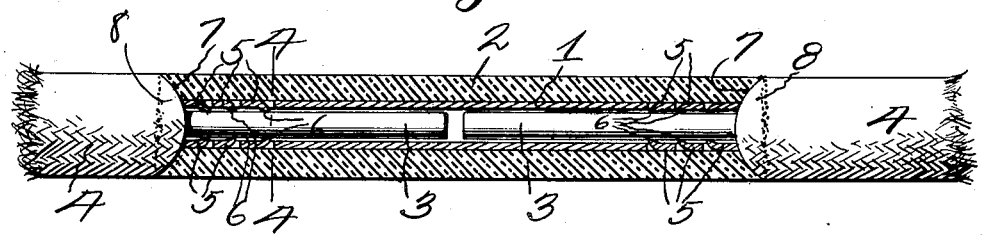
Figure 1 is a longitudinal sectional view through the connecter.
Figure 2:
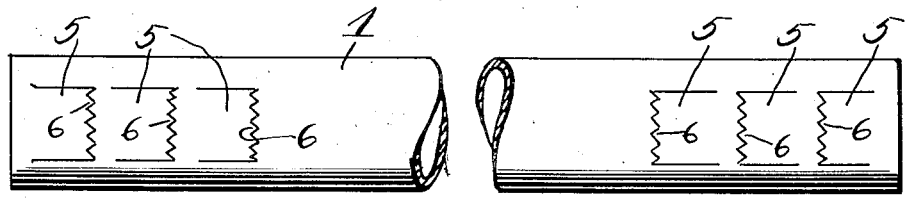
Figure 2 is a top plan view of the connecter sleeve.
Figure 3:
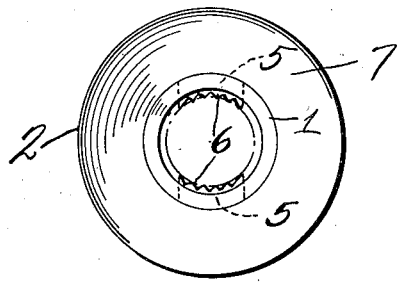
Figure 3 is an end view of the connecter.
Figure 4:
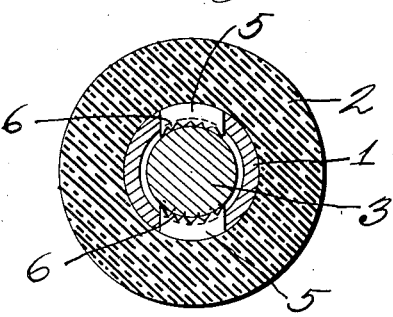
Figure 4 is a vertical transverse sectional view through the connecter taken on line 4—4 of Figure 1.

Referring to the drawing, the numeral 1 designates the elongated sleeve of the connecter, which sleeve is preferably cylindrically shaped as shown and 2 a covering of insulating material which may be of any suitable kind, and which is preferably adhesively connected to the outer periphery of the sleeve 1. Sleeve 1 is formed from a conductor material, for instance brass or copper, however it is preferably of a metal harder than the ends 3 of the conductor wires 4, which are to be connected together, the purpose of which will presently appear. Heretofore wires have been connected together by splicing or soldering, however to properly splice a wire or solder the same, it requires considerable skill, and a skill beyond that of an ordinary mechanism or a person who is not a mechanic at all, therefore the sleeve 1 adjacent its opposite end is provided with struck out members 5, which extend inwardly towards the middle of the sleeve and have their inner end provided with a plurality of teeth 6, which extend inwardly towards the axis of the sleeve and are normally in the position shown in Figure 3. When the ends 3 of the wires are forced into the opposite ends of the connecter sleeve 1, the members 5 are forced slightly outwardly, and after the wires 3 are in their extreme inner positions the teeth 6, which are concentrically arranged, will bite into the opposite sides of the wire ends 3, partially imbedding themselves and positively gripping the wire ends 3, thereby preventing said ends from coming out of the sleeve 1. It will be noted that when a pull is imparted on the wires, the greater the pull, the tighter the members 5 will grip the wire ends as the teeth 6 will be further imbedded in the opposite sides of the wire ends. The opposite ends of the insulation 2 are preferably concaved as shown at 7 for the reception of the convexed ends 8 of the wires 4, thereby forming an overlapping connection of the insulation for preventing collection of dirt, dust or water, and for making a needy connection.

From the above it will be seen that an electric connecter is provided for electric conductor wires, which connecter is simple in construction, formed from a metallic sleeve and provided with means whereby, when the adjacent ends of conductor wires are forced into the opposite ends of the sleeve, said conductor wire ends will be positively gripped and held, and the device may be easily and quickly applied by a person unskilled in forming splices and connections in electric conductors. It will also be seen that the device may be cheaply manufactured and sold.

The invention having been set forth what is claimed as new and useful is:—

The combination with the adjacent ends of conductor wires, of a connecter, said connecter comprising a sleeve in the opposite ends of which the conductor wire ends are disposed, said sleeve adjacent its ends being provided on opposite sides with oppositely disposed relatively wide struck out spring members extending towards the center of the sleeve, said struck out members having their inner ends provided with arcuately arranged teeth extending into the chamber of the sleeve and arcuately imbedded in the conductor wire ends.

In testimony whereof I have signed my name to this specification.

LOUIS J. BRUNE, Sr.